United States Patent
Chen et al.

(10) Patent No.: US 9,195,026 B1
(45) Date of Patent: Nov. 24, 2015

(54) STEP RESPONSE SUPPRESSION STRUCTURE OF LENS DRIVING APPARATUS

(71) Applicant: TOPRAY MEMS INC., Hsinchu (TW)

(72) Inventors: Yi-Jung Chen, Hsinchu (TW); Chin-Sung Liu, Hsinchu (TW); Ping-Ju Chang, Hsinchu (TW)

(73) Assignee: TOPRAY MEMS INC., Hsinchu (TW)

( * ) Notice: Subject to any disclaimer, the term of this patent is extended or adjusted under 35 U.S.C. 154(b) by 0 days.

(21) Appl. No.: 14/455,247

(22) Filed: Aug. 8, 2014

(51) Int. Cl.
*G02B 7/02* (2006.01)
*G02B 7/04* (2006.01)
*G03B 3/10* (2006.01)

(52) U.S. Cl.
CPC ... *G02B 7/04* (2013.01); *G03B 3/10* (2013.01)

(58) Field of Classification Search
CPC .................................... G02B 7/00; G02B 7/02
USPC .............. 359/819, 822, 811, 815; 310/12.27, 310/12.31
See application file for complete search history.

(56) References Cited

U.S. PATENT DOCUMENTS

| | | | |
|---|---|---|---|
| 7,880,982 B2 * | 2/2011 | Otsuki | G02B 7/04 359/819 |
| 7,952,822 B2 * | 5/2011 | Lai | H02K 41/0356 359/819 |

* cited by examiner

*Primary Examiner* — Tuyen Tra
(74) *Attorney, Agent, or Firm* — Rabin & Berdo, P.C.

(57) ABSTRACT

According to one exemplary embodiment, a step response suppression structure of lens driving apparatus is provided and adapted to a lens driving apparatus with a fixed portion and a movable portion. The step response suppression structure includes a cantilever element and a damping element; a first connector end of the cantilever element is directly secured to the movable portion, the damping element is connected with a second connecting end of the cantilever element to the fixed portion. When the movable portion performs any movement, the cantilever element and the damping element reduce setting time by the movable portion through setting the step response suppression structure between the movable portion and the fixed.

13 Claims, 5 Drawing Sheets

STEP RESPONSE SUPPRESSION STRUCTURE OF LENS DRIVING APPARATUS

TECHNICAL FIELD

The present disclosure generally relates to step response suppression structure of lens driving apparatus.

BACKGROUND

Along with breakthroughs and advances in technology, camera pixels required in mobile phone are significantly increased. However, a lot of blurry photos often appear when high-resolution camera used for high-speed dynamic shooting, thus mobile phone users are troubled by the situation of high-speed shooting. This troubled situation has two main causes: the step response of structure causes failure of achieving focus (setting time is too long) when apparatus operates focus; and mobile phone physical shaking occurs when holding the phone or pressing the shutter button.

In a conventional technique, a damper shock-absorbing element between a movable portion and a non-movable portion of a lens driving apparatus is directly set for the step response of structure causing focus failure. However, when this conventional technique in actual use, it will likely induce phenomenon of over-damping to result in other problems of focusing.

SUMMARY

The exemplary embodiments of the disclosure may provide a step response suppression structure of lens driving apparatus.

One exemplary embodiment relates to a step response suppression structure of lens driving apparatus, adapted to a lens driving apparatus having a fixed portion and a movable portion. The step response suppression structure includes a cantilever element and a damping element; the cantilever element having a first connecting end and a second connecting end, wherein the first connecting end is directly secured to the movable portion, the second connecting end is connected with the damping element end to the fixed portion. When the movable portion performs any movement, the cantilever element and the damping element reduce setting time by the movable portion through setting the step response suppression structure between the movable portion and the fixed portion.

DETAILED DESCRIPTION OF DISCLOSED EMBODIMENTS

Figure 1:
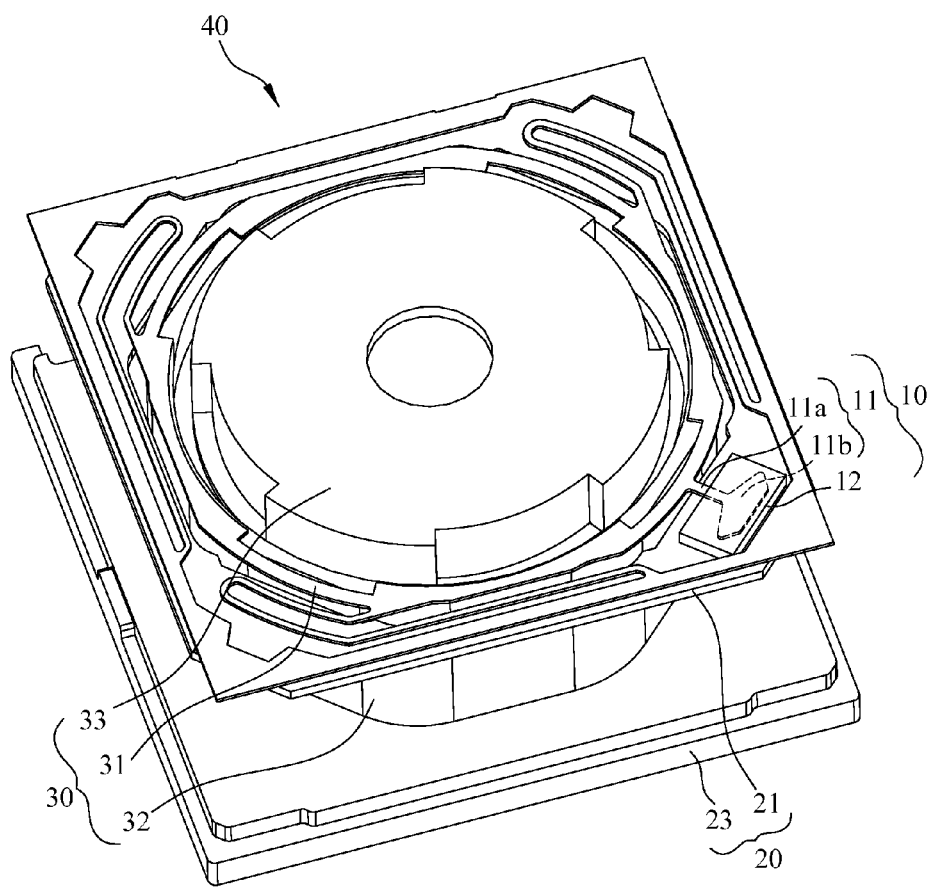
FIG. 1 illustrates a step response suppression structure of lens driving apparatus, according to an exemplary embodiment.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

FIG. 1 illustrates a step response suppression structure of lens driving apparatus, according to an exemplary embodiment. As shown in FIG. 1, the step response suppression structure of lens driving apparatus 10 is adapted to a lens driving apparatus 40 having a fixed portion 20 and a movable portion 30. The step response suppression structure 10 includes a cantilever element 11 and a damping element 12; the cantilever element 11 having a first connecting end 11a and a second connecting end 11b, wherein the first connecting end 11a is directly secured to the movable portion 30, the second connecting end 11b is connected with the damping element end 12 to a yoke 21 of the fixed portion 20. When the movable portion 30 performs any movement, the cantilever element 10 and the damping element 12 reduce setting time by the movable portion 30 through setting the step response suppression structure 10 between the movable portion 30 and the fixed portion 20. The fixed portion 20 further includes an outer yoke 22 (not shown) and a base 23. The movable portion 30 further includes an elastic suspension element 31, a lens holder seat 32, and a lens 33; wherein the first connecting end 11a can be directly connected to the elastic suspension element 31 or the lens holder seat 32. The outer yoke 22 and the base 23 coated the movable portion 30 internally. The lens 33 is provided in the internal of the lens holder seat 32, the lens holder seat 32 is connected with the elastic suspension element 31.

Following the above, the first connecting end 11a of the cantilever element 11 is connected to the movable portion 30, and the movable portion 30 and the lens holder seat 32 are connected. Therefore, the first connecting end 11a can perform synchronized operation with the lens holder seat 32, and displacement and velocity of the cantilever element 11 are equal to magnitude and direction of the lens holder seat 32. The second connecting end 11b of the cantilever element 11 is set in the damping element 12. The damping element 12 is set in the yoke 21 of the fixed portion 20, i.e., the damping element 12 is set between the second connecting end 11b and the yoke 21, so that the two are actually joined but do not actually touched. Thus the vibration structure 10 combined by the damping element 12 and the cantilever element 11, can achieve effect of step response suppression. For example, since the step response suppression structure 10 is set between the fixed portion 20 and the movable portion 30, therefore when the lens holder seat 32 bearing the lens 33 in the movable portion 30 performs continuous focus operation, the first connecting end 11a (fixed end) of the cantilever element 11 and the movable portion 30 performs synchronized movement, its displacement and speed is equal to magnitude and direction of the lens holder seat 32. The second connecting end 11b (free end) is set in the damping element 12, by means of the damping element 12 coupled to the yoke 21, the cantilever damping element 11 interacts with the damping element 12 to achieve the purpose of reducing setting time. When focus operation is completed, it is possible to effectively reduce the time delay effect of step response at focusing of the movable portion 30.

The first connecting end 11a of the cantilever element 11 is directly connected to the movable portion 30, displacement and velocity of the cantilever element end 11a and end 11b are equal to magnitude and direction of the movable portion 30, so that the maximum damping effect is obtained; Conversely, the rigid of the cantilever element 11 changes itself as an elastic body, so that displacement and speed of the cantilever element end 11b is lower than the magnitude of the movable portion 30, the damping effect can be reduced, thus the adjustment of the damping efficiency is achieved. Therefore, the damping effect produced by the cantilever element 11 can be changed by adjusting the rigidity of the cantilever element 11, e.g., soft or hard. For example, when the weight of the movable portion increases, the cantilever element 11 is adjusted to harder rigidity, thus the damping effect is increased in order to achieve optimized reducing setting time.

Figure 2A:
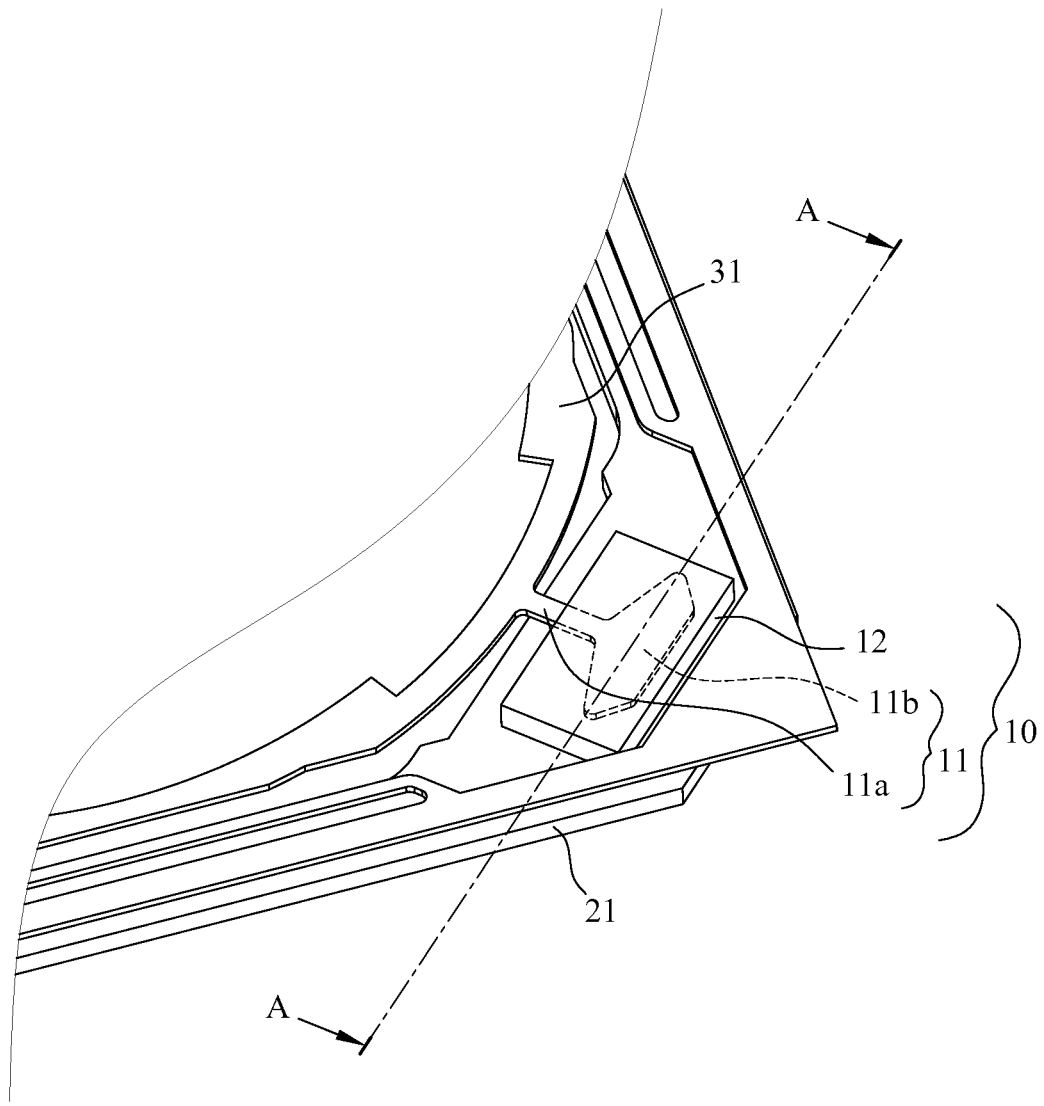
FIG. 2a illustrates detailed connecting diagram of the step response suppression structure, the cantilever element, the damping element, and the fixed portion, according to an exemplary embodiment.

FIG. 2a illustrates detailed connecting diagram of the step response suppression structure, the cantilever element, the damping element, and the fixed portion, according to an exemplary embodiment. As shown in FIG. 2a, according to the present exemplary embodiment, the step response suppression structure 10 is set between the elastic suspension element 31 and the yoke 21. The first connecting end 11a of the cantilever element 11 is fixed to either end of the elastic element 31. The second end 11b is connected with the damping element 12 to couple to the yoke 21. Accordingly, the damping element 12 can inhibit and absorb the response generated by the cantilever element 11 and the movable portion 30 (not shown).

Figure 2B:
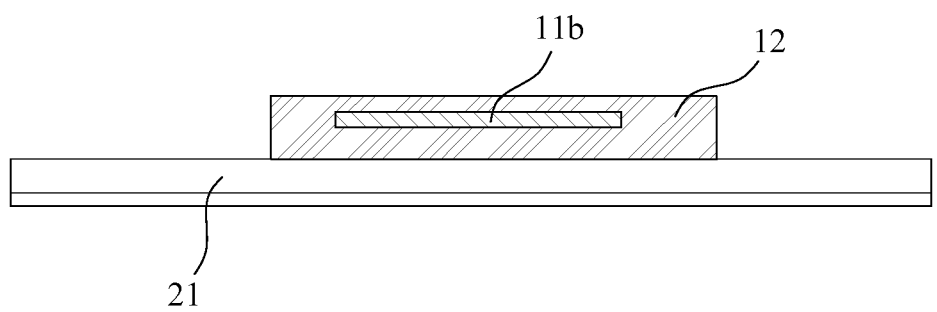
FIG. 2b illustrates the relative positions among the cantilever element, the damping element, and the fixed portion of the cross sectional view in FIG. 2a, according to an exemplary embodiment.

FIG. 2b illustrates relative positions among the cantilever element, the damping element, and the fixed portion of the cross sectional view in FIG. 2a, according to an exemplary embodiment. As shown in FIG. 2b, the second connecting end 11b of the cantilever element 11 is fixed to a yoke 21 by the damping element 12, wherein the second connecting end 11b and the yoke 21 are not actually direct contacted; instead the damping element 12 is located between the second connecting end 11b and the yoke 21. Wherein the material of the damping element is a combination of a low rigidity and a high damping factor. This material of the combination of low rigidity and high damping factor such as one of a soft spring, a soft damping rubber, and a soft rubber.

Figure 3A:
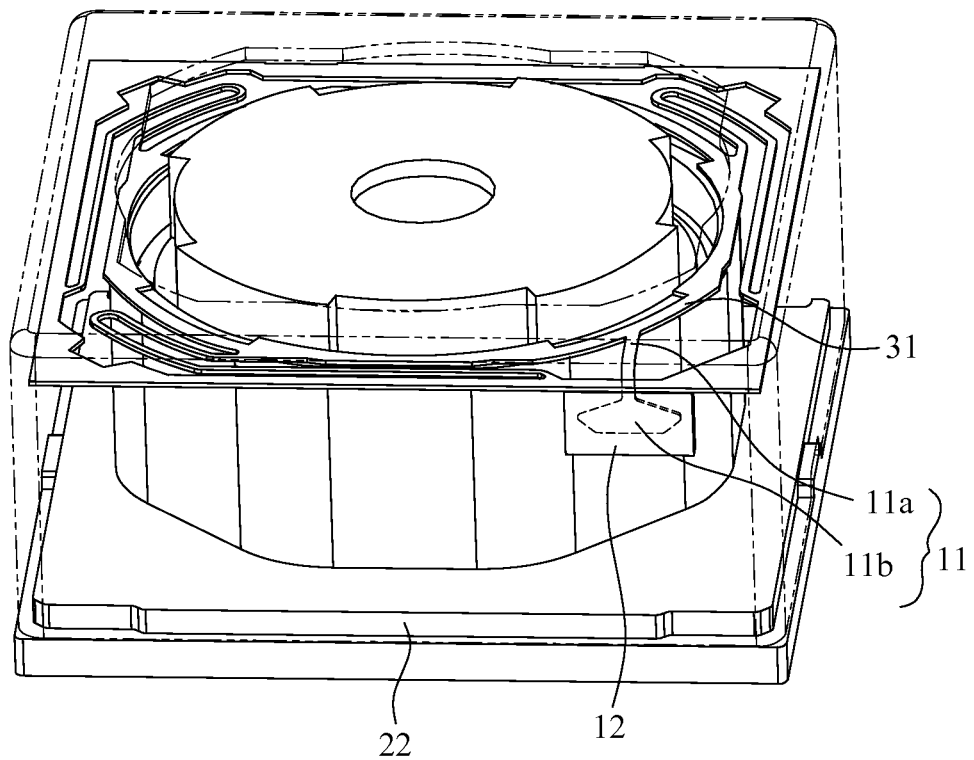
FIG. 3a, 3b illustrate the step response suspension structure and the damping element secured at the fixed portion, according to two exemplary embodiments.
Figure 3B:
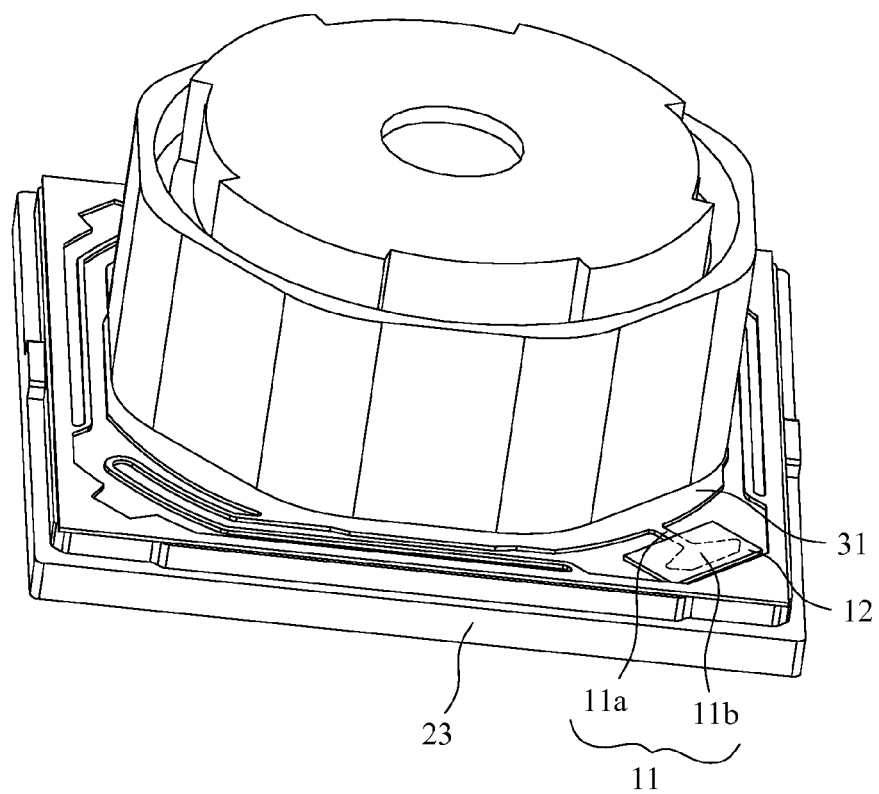

FIG. 3a, 3b illustrate the step response suspension structure and the damping element secured at the fixed portion, according to two exemplary embodiments. As shown in FIG. 3a, the first connecting end 11a of the cantilever element 11 is directly fixed to the elastic suspension element 31 of the movable portion 30, while the damping element 12 is connected with the second connecting end 11b to an outer yoke 22 of the fixed portion 20. Wherein the damping element 12 is set between the second connecting end 11b and the outer yoke 22. Accordingly, the second connecting end 11b is not directly fixed to the outer yoke 22. As shown in FIG. 3b, the first connecting end 11a of the cantilever element 11 is directly fixed to an elastic suspension element 31 of the movable portion 30, the damping element 12 is connected with the second connecting end 11b to a base 23 of the fixed portion 20. Wherein the damping element 12 is set between the second connecting end 11b and the base 23. Accordingly, the second connecting end 11b is not directly fixed to the base 23.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A step response suppression structure of lens driving apparatus, adapted to a lens driving apparatus having a fixed portion and a movable portion. The step response suppression structure includes: a cantilever element and a damping element;
    said cantilever element having a first connecting end and a second connecting end, said first connecting end is directly secured to said movable portion; and
    said second connecting end is connected with said damping element to said fixed portion;
    when said movable portion performs any movement, said cantilever element and said damping element reduce setting time by said movable portion through setting said step response suppression structure between said movable portion and said fixed portion.

2. The step response suppression structure as claimed in claim 1, wherein said fixed portion further includes components of an outer yoke and a base.

3. The step response suppression structure as claimed in claim 2, wherein said damping element is connected with said second connecting end to said outer yoke.

4. The step response suppression structure as claimed in claim 2, wherein said damping element is connected with said second connecting end to said base.

5. The step response suppression structure as claimed in claim 1, wherein said movable portion further includes an elastic suspension element and a lens holder seat.

6. The step response suppression structure as claimed in claim 5, wherein said first connecting end is fixed to said elastic suspension element.

7. The step response suppression structure as claimed in claim 5, wherein said first connecting end is fixed to said lens holder seat.

8. The step response suppression structure as claimed in claim 1, wherein said cantilever element is integrally molded.

9. The step response suppression structure as claimed in claim 1, wherein displacement and velocity of said cantilever element is equal to magnitude and direction of said movable portion to achieve the highest damping efficiency.

10. The step response suppression structure as claimed in claim 1, wherein rigidity of said cantilever element is adjusted, so that when displacement and speed is not equal to magnitude of said movable portion, the damper effect is reduced to achieve adjusting damping efficiency.

11. The step response suppression structure as claimed in claim 1, wherein said connecting damping element is set between said second connecting end of said cantilever element and said fixed portion.

12. The step response suppression structure as claimed in claim 1, wherein material of said damping element is combination of a low rigidity and a high damping factor.

13. The step response suppression structure as claimed in claim 12, wherein material of said low rigidity and said high damping factor is selected from one of a soft spring, a soft damping rubber, and a soft rubber.

* * * * *